United States Patent
Bringsjord et al.

(10) Patent No.: US 11,526,779 B2
(45) Date of Patent: Dec. 13, 2022

(54) ARTIFICIAL INTELLIGENCE PLATFORM FOR AUTO-GENERATING REASONING PROBLEMS AND ASSESSING SOLUTIONS

(71) Applicant: Motalen LLC, Troy, NY (US)

(72) Inventors: Selmer Bringsjord, Rensselaer, NY (US); Alexander Bringsjord, Rensselaer, NY (US); Naveen Sundar Govindarajulu, San Jose, CA (US)

(73) Assignee: Motalen LLC, Troy, NY (US)

(*) Notice: Subject to any disclaimer, the term of this patent is extended or adjusted under 35 U.S.C. 154(b) by 945 days.

(21) Appl. No.: 16/272,403

(22) Filed: Feb. 11, 2019

(65) Prior Publication Data
US 2019/0251454 A1 Aug. 15, 2019

Related U.S. Application Data

(60) Provisional application No. 62/628,413, filed on Feb. 9, 2018.

(51) Int. Cl.
*G09B 7/02* (2006.01)
*G09B 7/077* (2006.01)
*G06N 5/04* (2006.01)
*G06F 16/9032* (2019.01)
*G06F 16/9035* (2019.01)

(52) U.S. Cl.
CPC ........... *G06N 5/04* (2013.01); *G06F 16/9035* (2019.01); *G06F 16/90332* (2019.01); *G09B 7/02* (2013.01); *G09B 7/077* (2013.01)

(58) Field of Classification Search
None
See application file for complete search history.

(56) References Cited

U.S. PATENT DOCUMENTS

| | | | | |
|---|---|---|---|---|
| 5,584,699 A | * | 12/1996 | Silver | G09B 23/04 434/323 |
| 9,858,828 B1 | * | 1/2018 | Fuka | G09B 7/00 |
| 2013/0260356 A1 | * | 10/2013 | Kutty | G09B 7/00 434/354 |
| 2015/0039541 A1 | * | 2/2015 | Kapur | G06N 20/00 706/12 |
| 2015/0242978 A1 | * | 8/2015 | Zaslavsky | G06F 40/131 705/326 |
| 2016/0180733 A1 | * | 6/2016 | Foley, Jr. | G09B 7/00 434/350 |
| 2017/0278421 A1 | * | 9/2017 | Du | G09B 7/02 |
| 2018/0260472 A1 | * | 9/2018 | Kelsey | G09B 7/02 |

OTHER PUBLICATIONS

"Proof Explorer—Home Page." Metamath, https://us.metamath.org/mpeuni/mmset.html (Year: 2021).*

* cited by examiner

*Primary Examiner* — Andrew B Whitaker
(74) *Attorney, Agent, or Firm* — Hoffman Warnick LLC (57) ABSTRACT

An artificial intelligence (AI) logic problem platform. A disclosed system includes a first AI module having: a problem generator for automatically generating unique reasoning problems; and a solution analyzer for automatically analyzing a logic solution submitted in response to an automatically generated reasoning problem; and a second AI module includes a user interface for allowing a user to create the logic solution and output a solution file.

20 Claims, 10 Drawing Sheets

```
{
{:name "Special Problem Batch A ID 0"
 :givens [silver(or gray(not black)coal)(or(not gray)coal(not silver))]
 :goal (or black silver)}
{:name "Special Problem Batch A ID 1"
 :givens [(or(not large)minute)(or(not large)(not minute))(or(not great)(not minute))]
 :goal (or(not large)tiny)}
{:name "Special Problem Batch A ID 2"
 :givens [(not joy)(not happy)]
 :goal (or(not glee)(not happy)(not cheer))}
{:name "Special Problem Batch A ID 3"
 :givens [glee(or glee(not joy)joy)]
 :goal (or glee merry)}
{:name "Special Problem Batch A ID 4"
 :givens [(or small great minute)(or small(not large)great)]
 :goal (or small(not tiny)great minute)}
{:name "Special Problem Batch A ID 5"
 :givens [small(or(not small)large)]
 :goal large}
{ :name "Special Problem Batch A ID 6"
 :givens [(or(not venus)(not pluto))(or pluto(not pluto)jupiter)(or(not mars)jupiter)]
 :goal (or(not mars)pluto jupiter)}
{:name "Special Problem Batch A ID 7"
 :givens [(not steel)(or gold(not gold)iron)(or steel(not silver))]
 :goal (or(not gold)(not steel))}
{:name "Special Problem Batch A ID 8"
 :givens [(not gray)]
 :goal (or(not gray)(not coal))}
{:name "Special Problem Batch A ID 9"
 :givens [(not gray)(or gray black)(or(not dark)silver)]
 :goal (or(not gray)(not black)(not silver))}
{:name "Special Problem Batch A ID 10"
 :givens [(not farther)]
 :goal (or(not farther)(not nearby))}
{:name "Special Problem Batch A ID 11"
 :givens [(or black silver)]
```

ARTIFICIAL INTELLIGENCE PLATFORM FOR AUTO-GENERATING REASONING PROBLEMS AND ASSESSING SOLUTIONS

TECHNICAL FIELD

The subject matter of this invention relates to artificial intelligence platforms, and more particularly to a system and method of auto-generating reasoning problems and assessing solutions.

BACKGROUND

The Internet has greatly simplified and expanded the availability of educational resources with on-line learning courses, readily available course materials, textbooks, etc. One of the drawbacks however in formal educational settings, such as high schools and universities, is the ease with which students can locate solutions to problems (i.e., cheat). For example, a professor may assign problem sets at the end of a textbook chapter to a class. However, solutions to the problems may for example be available on the Internet, e.g., from a current student or previous students taking the class. Accordingly, professors must constantly be updating and mixing problem sets to reduce the possibility of cheating.

Issues become even more exacerbated when dealing with large class sizes in which solutions can be easily shared and problems need to be corrected by hand. For example, in classes involving material such as formal reasoning, e.g., logic, proofs, etc., each submitted solution requires the professor and/or assistants to review and grade each response.

SUMMARY

The present invention provides a technical solution involving artificial intelligence (AI) in which reasoning problems are automatically and uniquely generated for a user, such as a student. The student can then submit a solution file that is automatically assessed and graded. In the described approach, problems are generated without the use of a pre-existing bank/repository, or templates that are filled in with trivial variations. Instead, new problems are literally created out of an infinite space using artificial intelligence, with the slimmest of initial building blocks.

A first aspect provides an artificial intelligence (AI) logic problem platform, comprising: a first AI module (referred to herein as HyperGrader) that includes: a problem generator for automatically generating unique reasoning problems; and a solution analyzer for automatically analyzing a logic solution submitted in response to an automatically generated reasoning problem; and a second AI module (referred to herein as HyperSlate) that includes a user interface for allowing a user to create the logic solution and output a solution file.

A second aspect provides a method for using artificial intelligence (AI) to process logic problems, comprising: automatically generating a unique reasoning problem with a first AI module using logics that include a defined symbol set and a formal grammar; providing a second AI module having a user interface and logics editor for crafting a solution to the unique reasoning problem; receiving a solution file at the first AI module from the second AI module containing the solution; analyzing the solution to determine if the solution solves the unique reasoning problem; and generating a message to the second AI module with the solution results.

A third aspect provides an artificial intelligence (AI) logic problem platform, comprising: a problem generator that uses AI to automatically generate a unique reasoning problem using logics that include a defined symbol set and a formal grammar; and a solution analyzer that uses AI to automatically analyze a solution submitted in response to the unique reasoning problem, wherein the solution analyzer references a corresponding problem specification that defines a number of functions that are utilized to check each step in the solution.

Further aspects include program products for embodying any of the above aspects.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Figure 1:
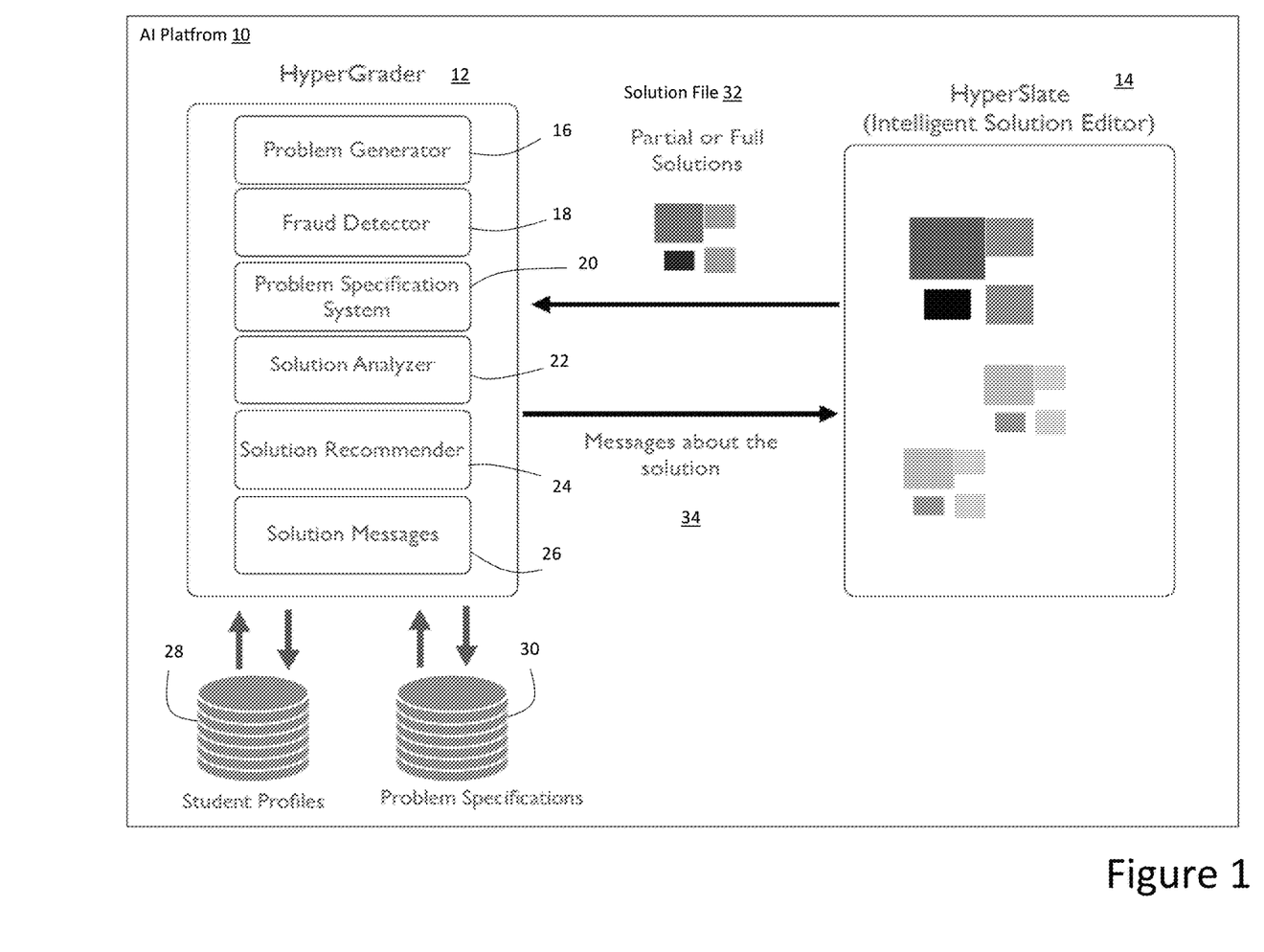
FIG. 1 shows an overview of an AI platform according to embodiments.

FIG. 1 depicts an overview of an Artificial Intelligence (AI) platform 10 capable of auto-generating logic problems, analyzing proposed solutions and providing an interface for allowing users to craft solutions. The logic problems ("problems" or "reasoning problems") in question are solved by providing either a suitable proof or set of proofs, a formal argument (a formal argument is one composed of a series of inferences that conform, or at least intended to conform, to a collection of inference rules), or a computer program given in a pure, general form of what is known as "logic programming." Platform 10 generally comprises two components, referred to herein as: (1) HyperGrader 12 (or "hypergrader system") which generates personalized problems and receives and analyzes proposed solutions; and (2) HyperSlate 14 (or "hyperslate system") which provides a user interface and editor in which these proof/proofs, arguments, and computer programs are built. Accordingly, HyperSlate 14 is the AI-infused system by which humans build proofs, formal arguments, and pure logic computer programs, typically as attempts to solve problems. HyperGrader 12 is on the other hand the AI-infused system for generating the problems in question, and for intelligently managing the proposed solutions to these problems, which are built in HyperSlate 14.

HyperGrader 12 generally includes an AI based problem generator 16 for generating unique formal reasoning problems; a fraud detector 18; a problem specification system 20; a solution analyzer 22 for automatically grading/assessing an inputted solution formulated by a user 16 in response to a generated problem; a solution recommender 24; and solution messaging 26. Formal logic and reasoning (or simply "reasoning") problems generally comprise any problem or challenge in which the user 16 is expected to formulate a proof or logic based solution in which systematic reasoning is employed.

In the example shown, problem generator 16 auto-generates a unique reasoning problem for a user in response to a user login and request. Because each reasoning problem is unique, its solution will not be applicable to other auto-generated problems, thereby alleviating potential copying and cheating issues in an educational setting. An illustrative approach for auto-generating reasoning problems using AI is described in further detail with regard to FIG. 2.

Figure 8:
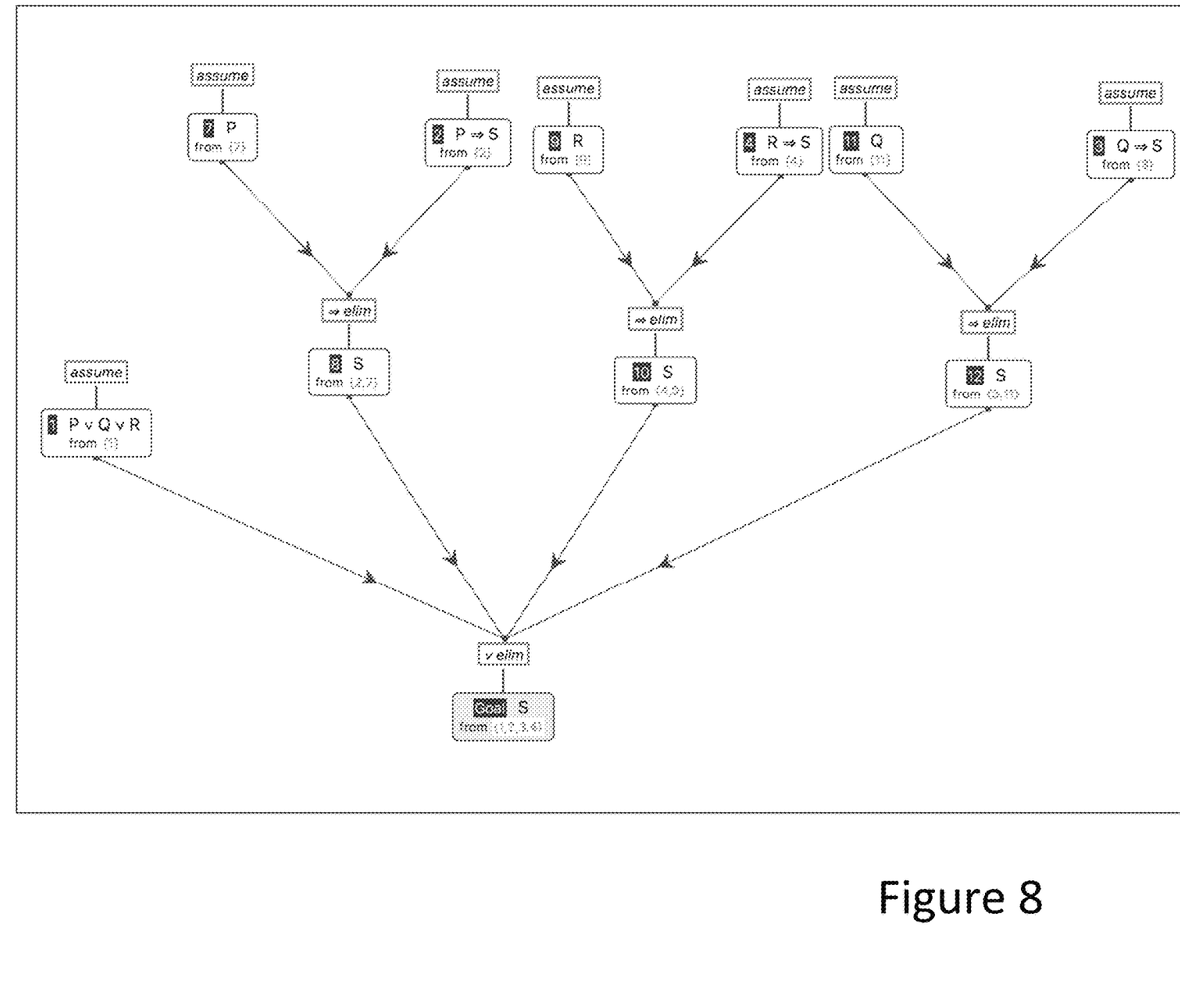
FIG. 8 shows a solution file according to embodiments.

As further shown in FIG. 1, once the reasoning problem is generated and presented to user (e.g., in a GUI), the user utilizes a solution editor, e.g., HyperSlate 14, in which the user creates a visual solution. An illustrative example of a visual solution or hypergraph is shown in FIG. 8. Once the user is satisfied with their solution, they can generate a solution file 32 containing a hypergraph and submit the solution file 32 to solution analyzer 22. Solution analyzer 22 automatically assesses the solution file 32 and generates a result (success, failure, partial success, grade, etc.).

As the user correctly solves problems, the difficulty level may increase for the user for future reasoning problems. Further, problems may be generated in a personalized manner that take account of the student profiles 28, e.g., prowess, past work, emotions, cognitive states, academic history, etc. (The information taken account of here can all be expressed in computational logics.) While generally targeted at educational environments, it is understood that the AI platform 10 can be used for any professional or non-education activity in which users are creating systematic arguments or proofs, e.g., intelligence analysts, mathematicians, business, teachers/professors of such material, and so on. Any visual or logic format for the solution file 32 may be utilized to express the argument and/or proof. The solution analyzer 22 may be utilized as a standalone system, e.g., for a student submitting a proof that they propose as a valid solution to a problem appearing in a textbook, or a problem created de novo.

In analyzing a solution file 32, solution analyzer 22 may reject or accept the solution as correct, offer a diagnosis and/or employ the solution recommender 24 to facilitate a solution. For instance, Algebra 2 textbooks are used in high schools across the U.S. (and beyond). In nearly all of these textbooks, students are given problems that ask if they can prove or disprove mathematical propositions. These students can submit them in the solution file 32, and solution analyzer 22 can assess and diagnose the input. (Currently, only paper-and-pencil is used, and the submissions are manually graded by human teachers.) The method can work for any problem whatsoever that calls for systematic reasoning in the domains of mathematics, formal logic, computer science, and so on. And, as mentioned, HyperGrader 12, given a domain that is being taught, can generate the problems first, then present them to students, whereupon submissions can be analyzed. Automated assessment and diagnosis are automatically created, and refuted as feedback.

The following definitions are utilized herein:

Topic: subjects or domains that the student has to learn and master.

Level: A natural number indicating degree of a student's mastery of a topic.

Problems: A problem is a challenge to either answer a question in connection with given content (e.g., "Is it provable from set of formulas X that P? If so, provide such a proof.") or to provide a pure logic program that, in the general case, answers a question or computes a function (e.g., "Provide a logic program that computes the factorial function defined as follows in definition D.").

Cognitive Calculus (CC): This is a highly expressive multi-operator model logic in which the cognitive and emotional states of humans can be represented, and automatically reasoned over. CC is described in further detail in US Patent Publication, 2018/0285743, Counter Fraud System, published on Oct. 4, 2018, which is hereby incorporated by reference. Natural language parsers described herein are used to translate statements in natural languages (such as English, French, etc.), submitted into HyperSlate 14, into statements in CC. These CC statements can then be understood and processed by HyperGrader 12.

As noted, HyperGrader 12 includes various functions, including a solution analyzer 22 that can check and either validate or reject as invalid formal arguments, would-be proofs, and attempted computer programs. Furthermore, problem generator 16 is capable of automatically generating new problems from scratch, which are solvable by the creation of suitable proofs and pure logic programs Generated problems at any level of expressivity in formal logics and multiple levels of logics are within the range of HyperGrader 12. Logics increase in expressivity and complexity of formulae, and in their associated proof theories. (The proof theory is what defines and bounds what can be proved in a given logic.) HyperGrader 12 can generate (and analyze, etc.) problems cast at a level below the propositional calculus (propositional calculus with restricted proof theory, for instance) to multi-operator quantified modal logic of at least third order (although lower orders could be employed), and also meta-logical syntax. While certainly systems for finding and articulating proofs in various systems of high expressivity have long been explored, the generation of problems in these different logical systems is a novel development.

HyperGrader 12 generates personalized, novel and unique problems at an appropriate level using problem specification system 20. Human teachers interacting individually with any number of students can engage HyperGrader 12 to generate new problems based on the level of understanding of each student. While a user (e.g., student) uses HyperSlate 12 where the student has understanding of topic "T" at level "1", HyperGrader 12 generates and gives to HyperSlate 14 for presentation problems regarding T at level 1 plus some delta.

Additionally, new problems can be automatically generated by learning via analogy. HyperGrader 12 can generate new of problems that are analogous to problems that have been solved by a student. For instance, let a given student's level in a topic "S" be "n". If the student has solved a level m>n problem p in a topic T, then the problem specification system 20 can present a problem q to the student s in topic S that is analogous to p. Problem specifications 30 can be stored and retrieved as needed. Given the capability here for HyperGrader 12, problem generator 16 can in addition to creating problems from scratch, create new problems by learning from prior problems that it receives and studies. There are millions of these problems available on the internet.

Student profiles 28 provide a dynamic profile mapping each student and topic to a level. The system also has other relevant information about the students, such as natural languages known (e.g. English, French, Norwegian, etc.), favorite topics and problems, difficult topics and problems, physical locations, time of use, etc.

Problems may be generated by HyperGrader 12 at different levels and presented to students in a gamified fashion with explicit display of scores, leaderboards and messages/prompts to advance to more difficult levels.

Generated problems can be presented in one or more natural languages with enough variation to make it seem as though the text was generated by a human. The text is also personalized to each student. Some of the HyperGrader-generated problems may have automatically generated images and videos that describe the problem. The images and videos can also be personalized to each student. Both automatically generated and human-created problems for HyperSlate are not presented all at once. They are presented in such a timely and orderly manner as to maximize each student's mastery of a topic. HyperSlate can also be used to run timed contests for one or more problems. HyperGrader 12 can automatically disburse rewards for problem-solving success in competitions and with especially difficult problems. Rewards can be monetary in nature or digital/physical certificates of completion.

HyperGrader 12 may include a biometrics component, fraud detector (FD) 18, to ensure that no impersonation happens. A registered user's biometric markers are matched against data regarding subsequent work by a user of the system. Furthermore, HyperGrader 12 can suggest study partners and circles based on student profiles, admin and institute information, and social media data.

The overarching goal of the fraud detector (FD) within the HyperGrader 12 is to ascertain whether or not a submission or solution from a user/student has been copied from another user/student or from an illicit source (such as an online forum that contains solutions to prior well-known problems, or serves as a "blackboard" for posting of illicit, near real-time sharing of solutions recently obtained by cheaters). Copying here is defined in such a way that it includes attempts to make modifications relative to the source solution file in order to camouflage the fact that this source file is what has enabled a submission or solution to be obtained. Because of the nature of a formal argument, proof, or logic computer program constructed in the intelligent editor, it is possible for the automated reasoner in FD to check inter-provability of the relevant files overall, and indeed inter-provability of any two sub-parts of the relevant files, by running through permutations of substitutions of symbols from the underlying alphabet, and then testing. (The underlying alphabet is defined as a restriction that cannot be violated for all content in HyperSlate problems, and for all content in any intelligent editor for formal arguments, proofs, or logic computer programs.)

For example, let x be a solution, and let y be another file that is a camouflaged modification of x. (If y=x, then FD can prove y from x, and vice versa, directly; this is trivial for the automated reasoner in HyperGrader 12, and employed by FD.) FD can now test the sub-parts of both x and y, where substitution of symbols in permutations is made so that the characters align between x and y. Call these amended versions xa and ya. If the test reveals that these mere surface changes suffice to allow FD to prove ya from xa and prove xa from ya, then copying has occurred, and FD provides suitable notification to administrators.

In general, FD has a real-numbered function, $S(x,y)$, to compute when two submissions x and y are equivalent or similar. If $S(x,y)$ is less than a threshold T, x and y are classified as copies. (T is a parameter that can be adjusted. If an administrator were to allow unrestricted group work, T could be low, or even zero.) Given such a method, the FD divides all incoming solutions into equivalence classes. (The concept of an equivalence class is a well-known and well-defined one in mathematical logic.) Ideally, with zero fraud or plagiarism, the size of each equivalence class is 1. If an equivalence class EC has more than one element, it indicates that one submission in EC was copied partially or fully by the rest of the submissions in EC.

The fraud detector can also scrutinize online solutions posted by students in forums and discussion groups. This is achieved by equipping the FD with a set of URLs ($u1, u2, \ldots, un$) of forums on which discussion of problems and solutions appears, or perhaps where problems and solutions are posted. FD initiates a crawl starting at those URLs. Additionally, the fraud detector can be equipped with keywords and phrases ($w1, w2, \ldots$). The fraud detector then searches for these keywords and phrases via popular and common search engines to access any new forums that might crop up on which solutions are posted, and/or discussion of problems is held.

The solution recommender (SR) 24 can be used to provide help with completing problems. Normally this would be enabled only for exercise problems, but sometimes it may be desirable to allow such help in even full-blown problems the solutions to which earn users/students credit in a course or exam. The solution recommender 24 works in a manner similar to a human teaching assistant who guides a student. When a student approaches a good teaching assistant with a difficult problem, the assistant does not give the full solution to the student. Rather, the assistant prompts the student with possible next steps and suggestions and prods the student to continue from this point on to solve the problem on their own. The solution recommender 24 models such functionality.

Given a problem P, with a partial solution S, there can be several possible next steps ($s1, s2, \ldots$) that can be added to S towards a full solution F for P. Out of these steps, SR selects a few that are natural (natural: the step is small and readable and can eventually be a part of a small and readable solution). SR then presents these steps as possible next steps. From a user-interface point of view, SR can be regarded as working in a manner analogous to a text-suggestion interface. The underlying formal logic for the operation of SR for any partial solution S is such as to enable the overall method to be guaranteed to work. This is so because, for any partial solution S for any problem P that is solved by full solutions $F1, F2, \ldots, Fk$, the automated reasoner in HyperGrader can discover a full proof from S to a solution, that is one of Fi. This immediately makes available a series of hints, because hints are just any particular step or steps in Fi from S toward the conclusion. The (natural) number of steps m in a hint is configurable from the administrator/teacher; the larger the number m, the more helpful is the hint, and the less innovation is then required from the user/student. Note that this underlying formal logic will hold for any format of formal argument, or proof, or logic programming language whatsover, not just for the formats of HyperSlate 14.

Figure 2:
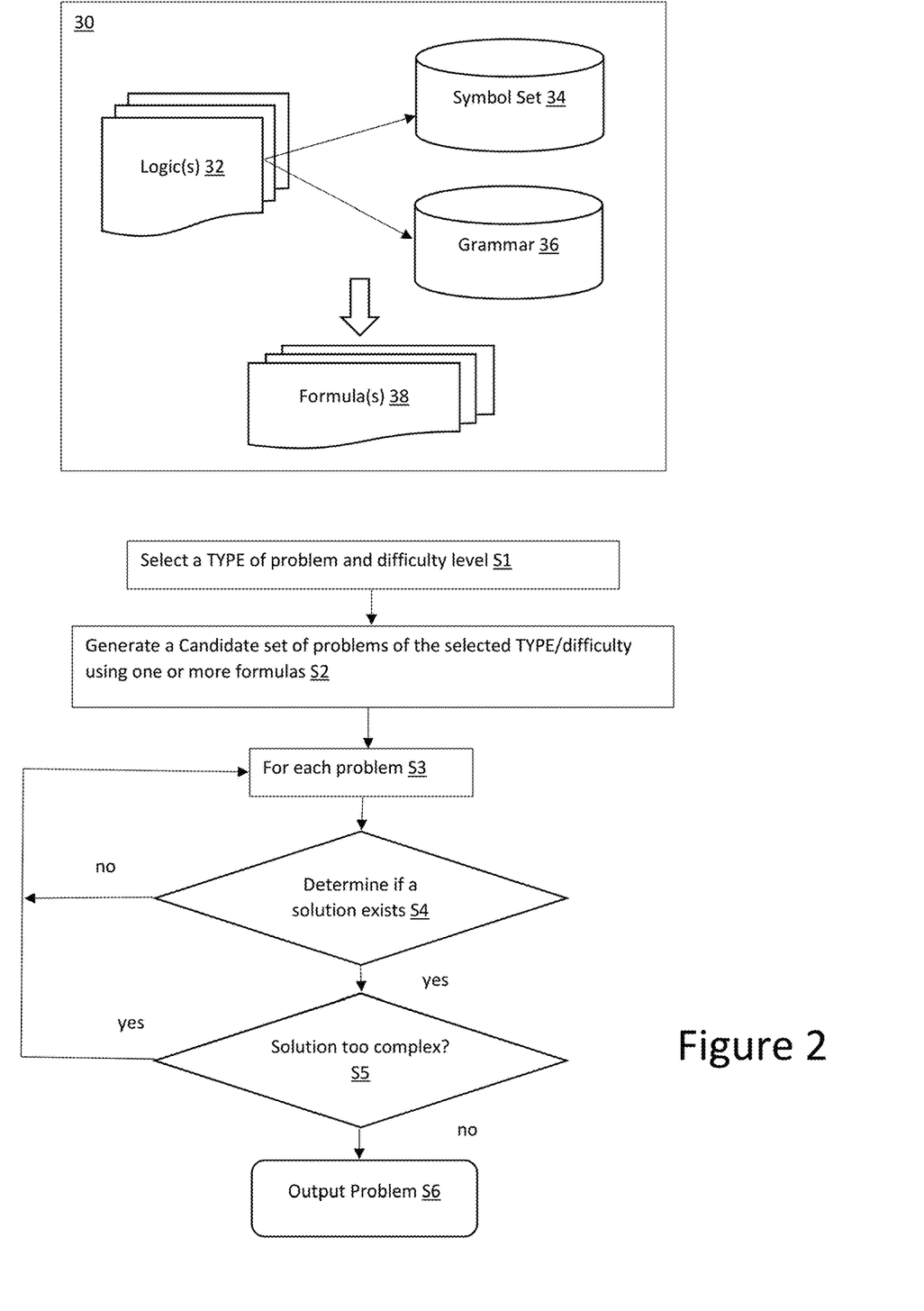
FIG. 2 shows a process for auto-generating logic problems according to embodiments.

FIG. 2 depicts an overview of the AI Problem Generator 16 implementation. The implementation may utilize one or more logics (i.e., logical systems) 32 that include a defined symbol set 34 and grammar 36. Logic is a type of formal system that uses symbol sets 34 (sometimes referred to as an alphabet) to finitely construct a formal language from a set of axioms through inferential rules of formation. Logic is a formal system together with a form of semantics, usually in the form of model-theoretic interpretation, which assigns truth values to sentences of the formal language, that is, formulae that contain no free variables. A logic 32 is sound if all sentences that can be derived are true in the interpretation, and complete if, conversely, all true sentences can be derived. Logics may include, e.g., game theory, calculus, algebra, geometry, ethics, etc.

Symbol sets 34 generally comprise relations (e.g., tall, short, above, between, etc.), functions (+, −, etc.) and operators. Grammar 36 is the set of rules for how strings of symbols can be composed into formulas. For example, in an animal domain where x is variable in this example defined as a kangaroo, yx(Tall(x)→Smart(x)) comprises a logic formula that represents the statement "all tall kangaroos are smart." For a given logic/domain, a set of formulas 38 is first generated.

Once the set of formulas 38 is defined, the dynamic process of generating a new problem first begins with the selection of a problem TYPE and difficulty level at S1. A first TYPE of problem is of the form:
  Given formula 1
  Given formula 2
  Given Formula 3
  Goal For example, consider the following problem: a triangle T as two interior angles that sum to 100 degrees (formula 1), so its third angle equals 80 degrees (formula 2), prove it (goal). Other TYPES of problems may be of the form "P or not P"; Axioms/Lemmas/Givens; Is it a theorem or a falsehood?; etc.

Next at S2, the system generates a candidate set of problems of the selected type/difficulty with the established formulas 38, using a random (or semi-random) process. Next at S3/S4 a determination is made whether a solution (i.e., proof) exists for each generated problem. Most candidate problems will likely not have a solution. Accordingly, if a problem does not have a solution (no at S4), the next candidate problem is checked, and so on until a problem is identified that has a solution. Determining whether a solution exists may be handled in any manner (e.g., using checker 14). Once a problem is identified having a solution, a check is then made at S5 to determine if the solution is too complex. If yes, the process repeats. If no, the problem is outputted at S6. Complexity may be determined in any manner, e.g., a threshold length may be checked.

Figure 3:
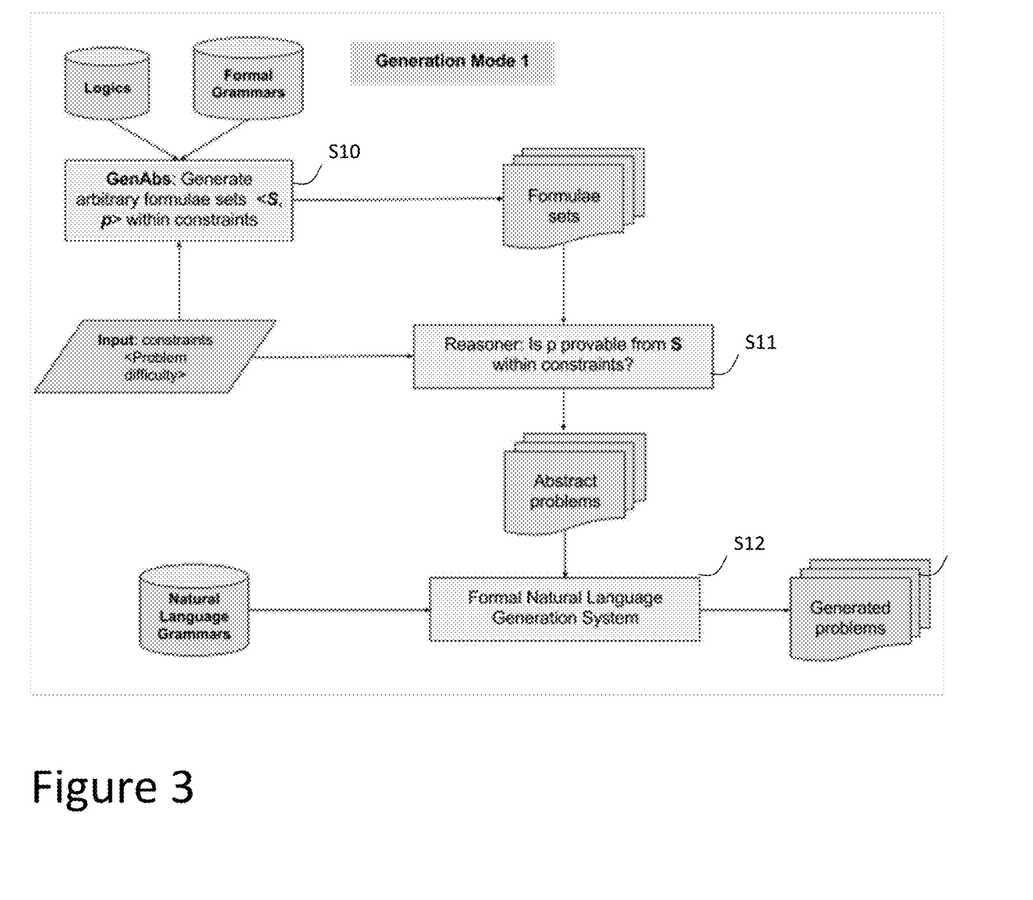
FIG. 3 shows a first auto-generation mode according to embodiments.

There may be two modes of problem generation for any problem domain. In Mode 1 (Generate and Test), we generate arbitrary formal objects that resemble problems and select only those that are actual problems. In this method, problem generator 16 generates m objects and out of those only n (with n<<m) objects might be actual problems. FIG. 3 depicts an illustrative process. At S10, arbitrary formulae sets <S, p> are generated within defined constraints (e.g., problem difficulty level) based on inputted formal grammars and logics. Next at S11, the formulae sets are evaluated by a Reasoner to determine which problems p within a set S are provable within the defined constraints. The result is a set of abstract problems. Abstract problems are problems represented in purely symbolic fashion. For example, a problem that asks to prove "q" given (1) "IF p THEN q" and (2) "p", is an abstract problem. Here S is composed of (1) "if p THEN q" and (2) "p". At S12, a formal natural language generator generates a set of problems using natural language grammars.

Figure 4:
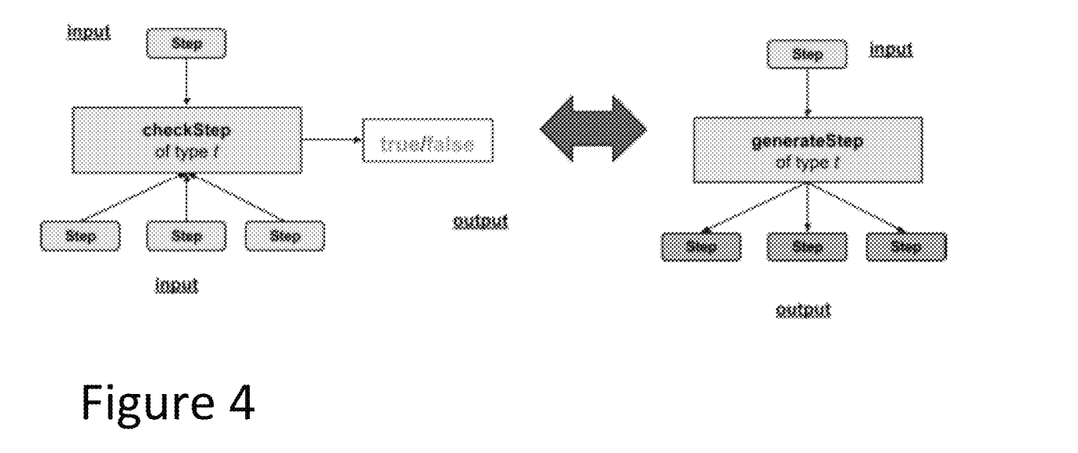
FIGS. 4-5 show a second auto-generation mode according to embodiments.
Figure 5:
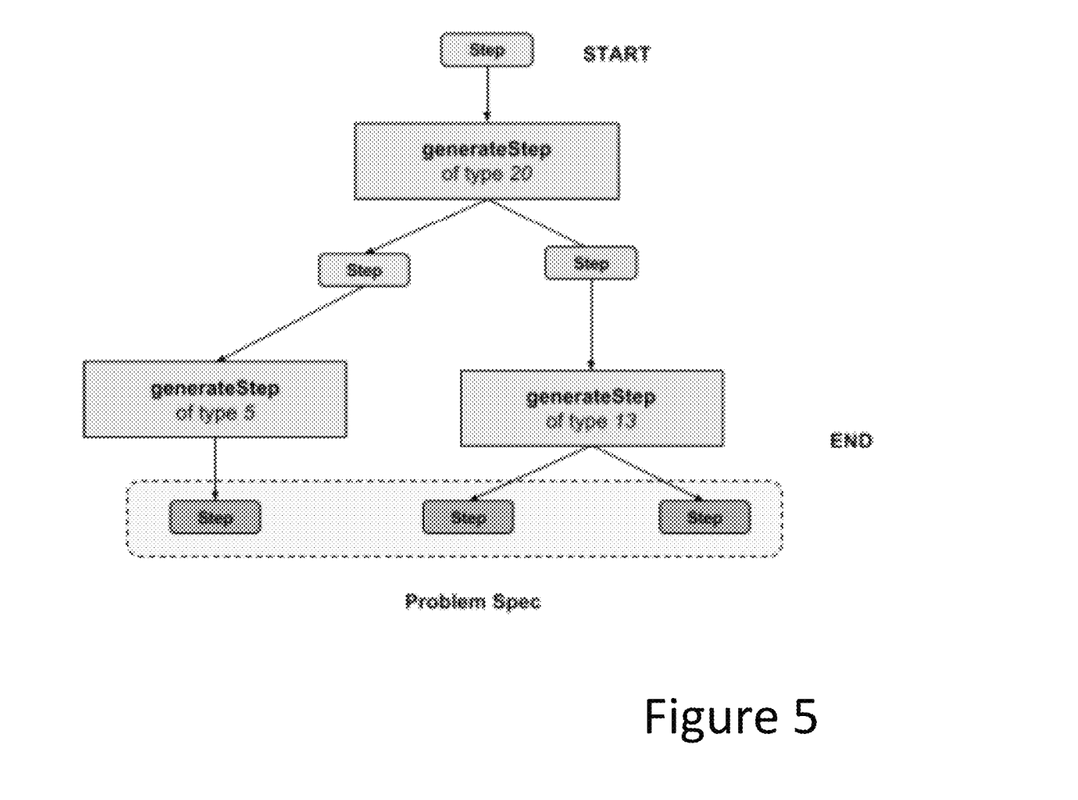

In Mode 2 (Analyze and Generate), analytical methods are used to generate only valid problems from the start, thus reducing computational overhead. FIGS. 4 and 5 depict an illustrative embodiment that utilizes checkStep and generateStep functions. A checkStep function checks whether a given step in a solution or proof is correct or not. A generateStep function generates a correct step in a solution or proof. For example, in classical logic, the inference schemata modus ponens lets us derive "Y" given "IF X THEN Y" and "X", where "X" and "Y" are variables in place of which we can use appropriate formal language expressions. For example, a generateStep function for modus ponens will generate the following (among an infinite number of other possibilities) expressions (given in the format inputs output):
  1. IF P THEN Q, P⇒Q
  2. IF A THEN B, A, ⇒B
  3. IF A THEN (B and C), A⇒B and C
Similarly, checkStep for modus ponens will output "true" for the above input/output expressions but output "false" for the below wrong input/output expressions:
  4. IF P THEN Q, P⇒U
  5. IF A THEN B, A, ⇒Q
  6. IF A THEN (B and C), A⇒Q Given T checkStep functions, there are T corresponding generateStep functions. Given a partial or empty proof or solution, the checkStep functions are used to check the given partial proof or solution. Then generateStep functions are used to enlarge or complete the proof or solution. An arbitrary generateStep function is chosen and some arbitrary input is selected for this function, which generates one or more steps. More generateStep functions are then selected to operate on the generated steps to generate yet more steps. This continues until a solution of a certain size is reached. The problem is then built from the solution by hiding all the steps except the final steps, as shown in FIG. 5.

Figure 6:
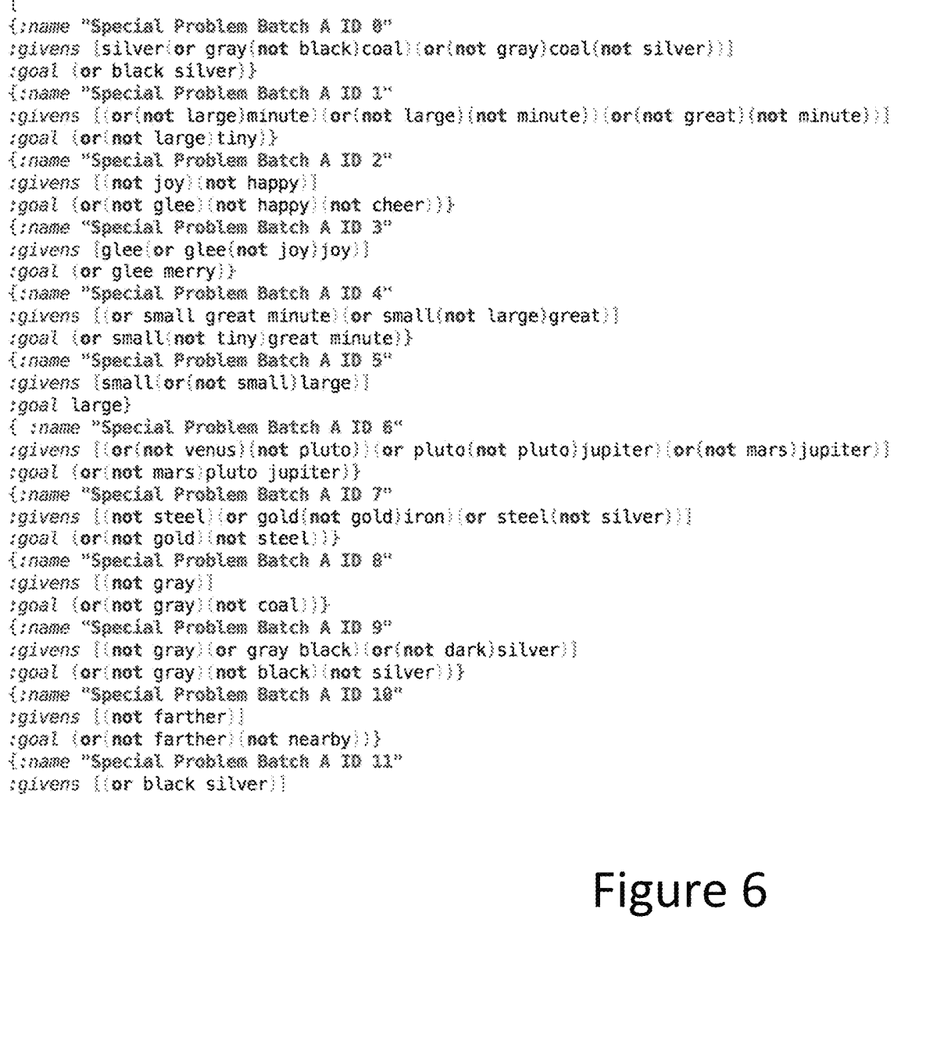
FIG. 6 shows a set of generated problems according to embodiments.

FIG. 6 depicts a listing of generated problems. As shown, each problem has a name, a set of givens, and a goal. For example, the first problem is named "Special Problem Batch A ID 0" and includes a set of givens "[silver (or gray (not black) coal) (or (not gray) coal (not silver))]". The goal is (or black silver). From this, a natural language problem can be generated. For this problem, the natural language translation is given below:

"If the given object is black, then it is either gray or coal. If the object is gray, then it is either not silver, or coal. It is silver. Can you prove that the given object is black or silver?"

As noted in FIG. 1, solution analyzer 22 receives a solution file 32, automatically analyzes the file 32 and generates a result. In one example, assume that HyperGrader 12 is grading and generating problems in some domain D, and the problems come from a space P. For an individual problem p specified by spec(p), a solution s is made up of a set of steps given by steps (s)=[s1, . . . sn] of different types ranging from 1 to T.

Figure 7:
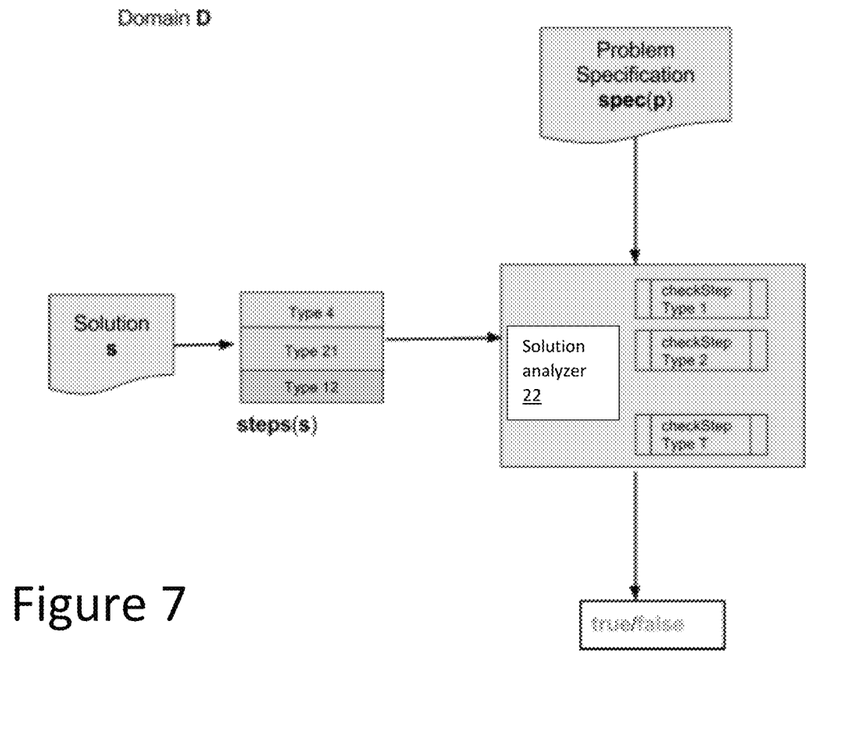
FIG. 7 shows a solution analyzer according to embodiments.

FIG. 7 depicts the analysis process. For a given domain D, solution analyzer 22 takes in the problem specification spec(p), a solution s, and a set of functions, checkSteps of different types. The checkStep functions operate on one or more steps and output true or false. If all the checkStep functions output true, the solution is deemed correct. One characteristic of the checkStep functions is that there is a corresponding generateStep function for each checkStep function, which takes in a partial step and generates a full step. This figure shows a solution s made up of multiple steps (e.g., of types 4, 21, 12, . . . ) being fed into the Solution Analyzer 22. The Solution Analyzer then checks a problem specification, spec(p), which defines a number checkStep functions (from type 1, type 2, . . . , to type T). The Solution Analyzer then uses these checkStep functions to check all the steps in the solution s and finally renders a verdict of true if the problem adheres to spec(p); else it outputs false.

Figure 9:
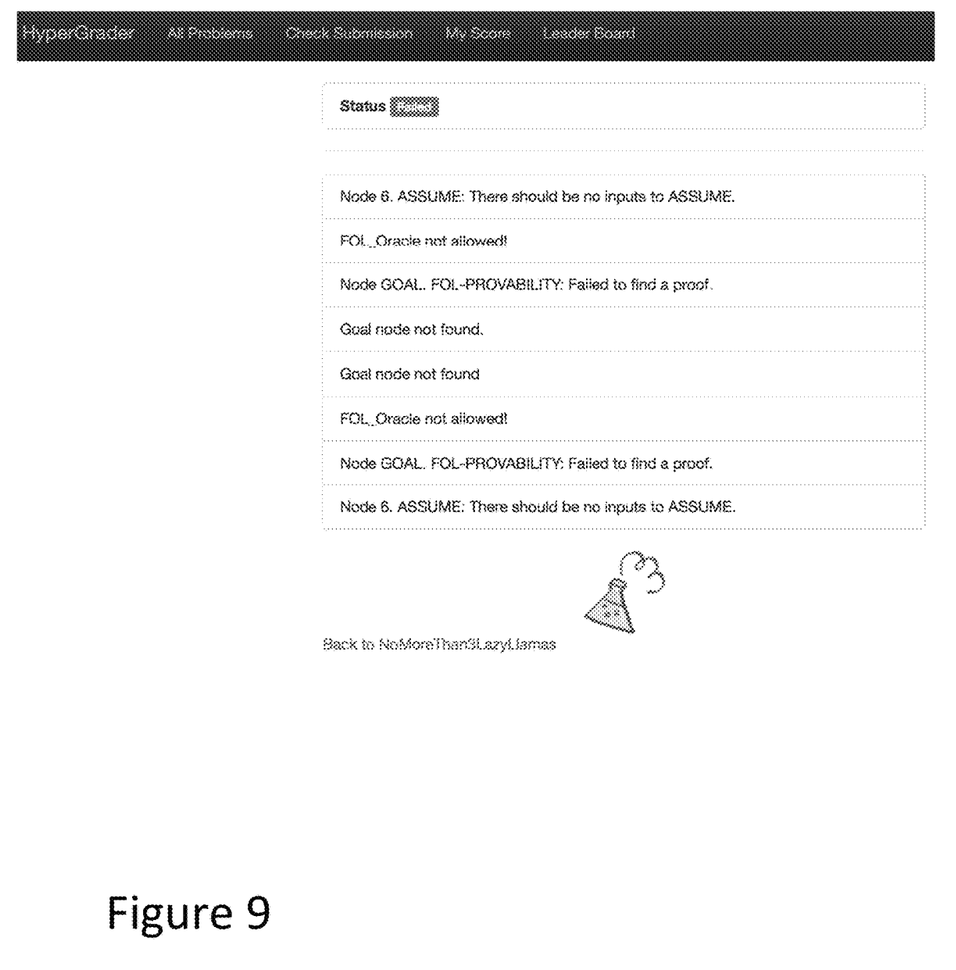
FIG. 9 shows an outputted result according to embodiments.

FIG. 8 depicts an example of a solution file 32 submitted by a user. In particular, this figure shows a screenshot of a student's solution in HyperSlate 14 that has been used to correctly prove S, labeled as (GOAL), given "P OR Q OR R" labeled as (1), "IF P then S" labeled as (2), "If Q THEN S" labeled as (3), "IF R THEN S" labeled as (4). FIG. 9 depicts an illustrative result 24. As shown in FIG. 9, a status of "Failed" is reported as well as some feedback regarding why the solution failed.

Figure 10:
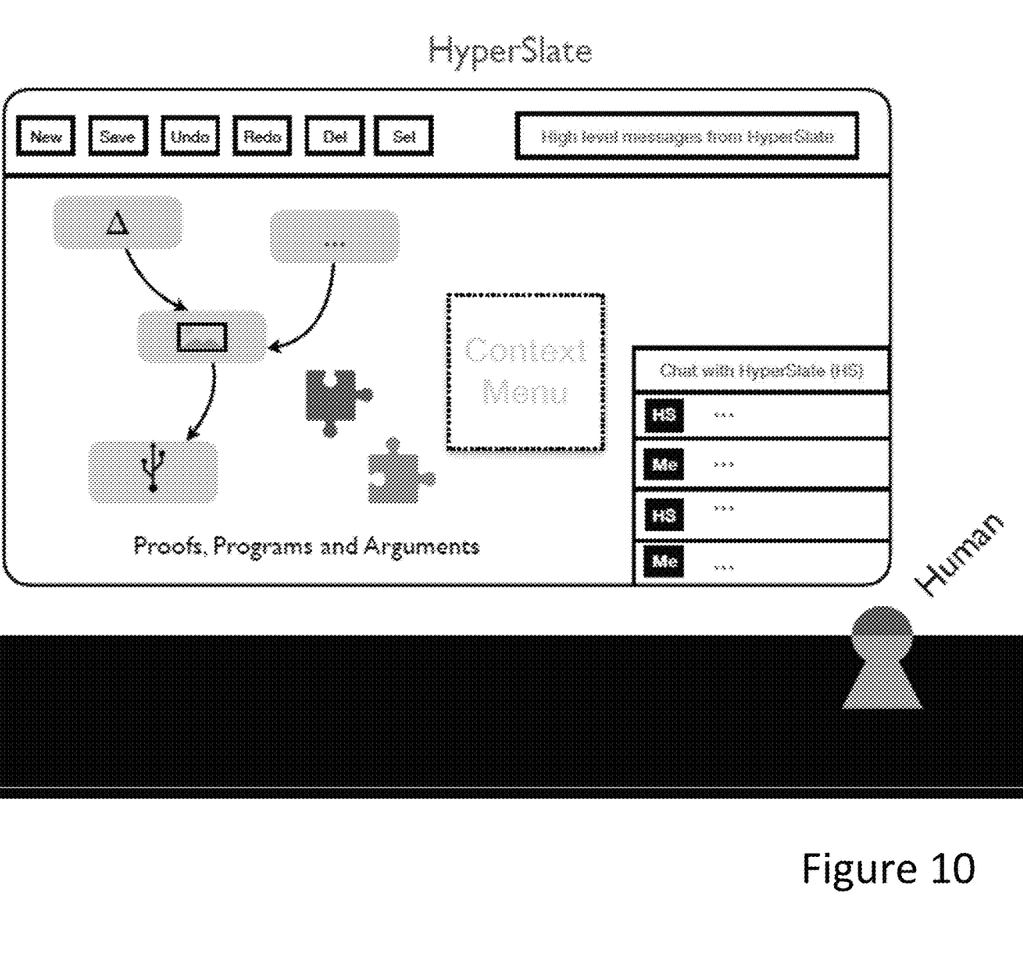
FIG. 10 depicts an illustrative HyperSlate interface according to embodiments.

FIG. 10 depicts an illustrative HyperSlate interface for allowing a user to create a proof in response to a presented logic problem. HyperSlate 14 can receive input expressed in natural languages like English, French, German, etc., and display as such, or translate into formal logic and display the corresponding formula. This is bidirectional: HyperSlate, if so desired by the user, can display content that has an underlying representation in a formal language for some logic, in natural language when presented to the user.

Students can chat with HyperSlate 14 about problems and topics, in any major natural language on Earth. Content in any natural language is parsed into an underlying highly expressive formal cognitive calculus (CC) that is the "native" language of both HyperSlate 14 and HyperGrader 12. HyperSlate 14 actively communicates with students over email, chat, and other channels about problems and topics that are unsolved and stagnant. HyperSlate also actively communicate updates, new topics and problems, and informs students of their status.

Formal reasoning problems, and pure logic programming problems, if expressed in systems other than HyperSlate, can be translated into the specific hypergraphical format of HyperSlate 14, and presented therein.

HyperSlate 14 may include a biometrics component to ensure that no impersonation happens. A registered user's biometric markers are matched against data regarding subsequent work by a user of the system.

HyperSlate 14 may include an embedded logic programming environment in which users can create, with help from an AI agent, computer programs in the pure logic programming style. In this style of computer programming, each program is all and only a set of formulas expressed in conformity with the formal language for a given formal logic.

HyperSlate 14, specifically, has an embedded graphical environment which can be used for expressing formal arguments, proofs, and pure logic programs. HyperSlate 14 may also include built-in persistence of all files, versioning features, and undo/redo capabilities.

In addition to graphical modes, HyperSlate 14 can be used in a notebook mode similar to the Jupyter environment. This feature can be used to directly build artifacts based upon formal arguments, proofs, and pure logic programs, such as slides, books, and articles ready for submission to different venues.

HyperSlate 14 allows users/students can organize their HyperSlate files in a cloud-based drive that provides familiar functionality such as folder structures, moving, copying, renaming, deleting, versioning, emailing, and web-publishing of files.

HyperSlate 14 has integrations with common robotics environments to enable teaching of artificial intelligence and machine learning courses that are devoted (in whole or in part) to the design and programming of robots. Specifically, the pure logic programs created in HyperSlate can be used to control the behavior of robots external to HyperSlate (and external to HyperGrader).

HyperSlate 14 has integrations with virtual environments and cyberspace to enable teaching of artificial intelligence and machine learning courses that are devoted (in whole or in part) to the design and building of non-physical artificial agents. Specifically, the pure logic programs created in HyperSlate can be used to control the behavior of artificial agents external to HyperSlate 14 (and external to Hyper-Grader).

Figure 11:
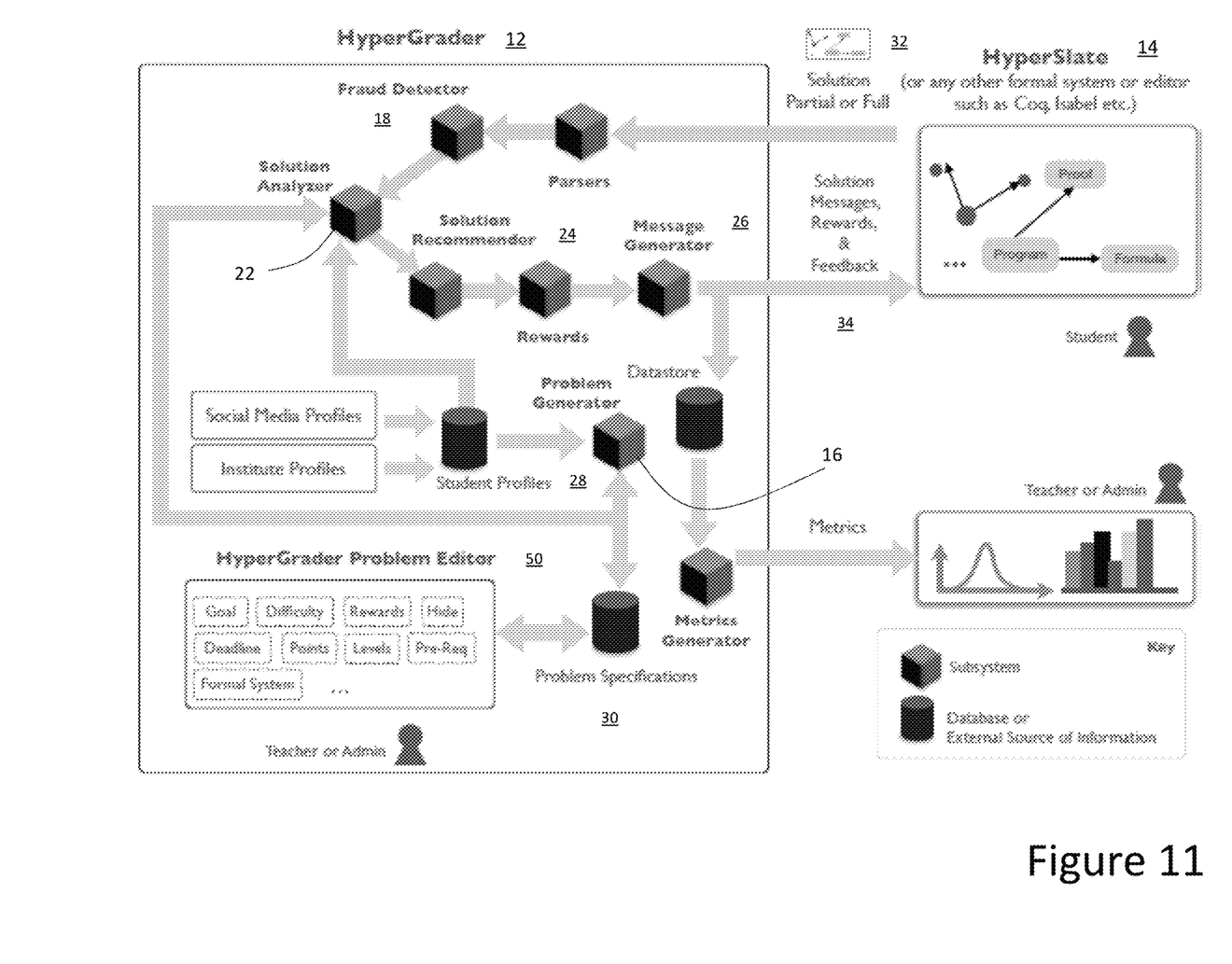
FIG. 11 depicts a process flow of the AI platform according to embodiments.

FIG. 11 depicts an illustrative process flow of the entire AI platform 10. As shown, the problem generator 16 generates unique reasoning problems based on student profiles 28 and problems specifications 30. Problem specifications 30 may for example include goals, difficulty, rewards, deadlines, points, levels, pre-requisites, formal systems, etc. Student profiles 28 may include social media profiles, institute profiles, etc. Once a problem is generated, the student can create a solution or partial solution, which can be submitted back to the HyperGrader 12 in a solution file 32. The solution file 32 is created by a student in HyperSlate 12 (or some other editor such as Coq, Isabel, etc.).

Once a solution file 32 is submitted back to HyperGrader 12, a parser receives and parses the file and submits it to fraud detector 18, which ensures that no copying has occurred. Solution analyzer 22 then analyzes the solution and generates a result and messaging via the message generator 26 back to the student. Messaging may for example include pass/fail, rewards, feedback, etc. In the case where a partial solution is received, solution recommender 24 may be employed to provide possible next steps to the student.

Results from each received solution may be collected in datastore and be submitted to a metrics generator that tracks successes, failures, etc. The metrics can then be reported to the teacher or administrator.

It is understood that HyperGrader 12 and HyperSlate 14 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An illustrative computing system for implementing HyperGrader may comprise any type of computing device and for example includes at least one processor, memory, an input/output (I/O) (e.g., one or more I/O interfaces and/or devices), and a communications pathway. In general, processor(s) execute program code which is at least partially fixed in memory. While executing program code, processor(s) can process data, which can result in reading and/or writing transformed data from/to memory and/or I/O for further processing. The pathway provides a communications link between each of the components in computing system. I/O can comprise one or more human I/O devices, which enable a user to interact with the computing system. Such a computing system may also be implemented in a distributed manner such that different components reside in different physical locations.

Furthermore, it is understood that the HyperGrader 12 and HyperSlate 14 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computing system having a memory and a processor configured to implement an artificial intelligence (AI) logic problem platform, comprising:
   a first AI module that includes:
      a problem generator for automatically generating unique logic problems that are each solvable with a proof, wherein the problem generator generates a set of arbitrary formulae with a defined difficulty level based on inputted formal grammars and a defined symbol set, wherein the set of arbitrary formulae includes problems that are provable with at least one proof and problems that are not provable, and wherein the problem generator determines which of the problems are provable; and
      a solution analyzer for automatically analyzing a logic solution submitted in response to an automatically generated unique logic problem; and
      a graphical user interface having a solution editor configured for allowing a user to create a visual representation of a proposed logic solution for analysis by the solution analyzer, wherein the graphical user interface includes a second AI module that facilitates creating a hypergraph of the proposed logic solution.

2. The AI logic problem platform of claim 1, wherein the problem generator utilizes stored user profiles to personalize the generated logic problem.

3. The AI logic problem platform of claim 1, wherein the problem generator first AI generates arbitrary formal objects, from which a subset of actual problems are identified to form the arbitrary formulae of provable and unprovable problems.

4. The AI logic problem platform of claim 1, wherein the problem generator:
   determines whether each of the at least one proofs is too complex by comparing a length of each proof to a threshold length; and
   outputs a resulting set of logic problems in a natural language.

5. The AI logic problem platform of claim 1, wherein the first AI module further includes a fraud detector that analyzes subparts of different logic solutions to identify copying.

6. The AI logic problem platform of claim 1, wherein the first AI module further includes a solution recommender that can auto-generate a set of potential next steps in solving the problem when a partial solution is presented.

7. The AI logic problem platform of claim 1, wherein the logic solution includes one of formal arguments, proofs, and pure logic programs.

8. A method for using artificial intelligence (AI) to process logic problems, comprising:
   automatically generating a unique logic problem with a first AI module using logics that include a defined symbol set and formal grammar that are each solvable with a proof, wherein the first AI module generates a set of arbitrary formulae with a defined difficulty level based on the defined symbol set and formal grammar, wherein the set of arbitrary formulae includes problems that are provable with at least one proof and problems that are not provable, and wherein the first AI module determines which of the problems are provable;
   displaying a graphical user interface having a solution editor configured for creating a visual representation of a logic solution to the unique logic problem, wherein the graphical user interface includes a second AI module that facilitates creating a hypergraph of the logic solution;
   receiving a solution file at the first AI module from the second AI module containing the logic solution;
   analyzing the logic solution to determine if the logic solution solves the unique logic problem;
   analyzing the logic solution against a second logic solution to identify copying, wherein subparts of the logic solution and second logic solution are analyzed by substituting symbols therein to create an amended logic solution and amended second logic solution; and
   generating a message to the second AI module with the solution results.

9. The method of claim 8, wherein the solution comprises one of formal arguments, proofs, and pure logic programs.

10. The method of claim 8, wherein the unique logic problem is created by:
   generating a set of arbitrary formulae comprised of a set of potential problems within a defined difficulty level based on inputted formal grammars and defined symbol set;
   evaluating which of the potential problems have proofs;
   selecting a problem that has a valid proof; and
   outputting the problem in a natural language.

11. The method of claim 8, further comprising: identifying copying by determining whether the amended logic solution and amended second logic solution can be proven from each other.

12. The method of claim 8, wherein in response to receiving a partial solution, recommending a set of potential next steps.

13. The method of claim 8, wherein the unique problem is based on a student profile.

14. The method of claim 13, wherein the unique problem is further based on a problem specification.

15. An artificial intelligence (AI) logic problem platform implemented on a computing system having a processor and memory, comprising:
   a graphical user interface having a solution editor configured for creating a visual representation of a logic solution, wherein the graphical user interface facilitates creating a hypergraph of the logic solution;
   a problem generator that uses AI to automatically generate a unique logic problem using logics that include a defined symbol set and a formal grammar that are each solvable with a proof, wherein the problem generator generates a set of arbitrary formulae with a defined difficulty level based on the defined symbol set and formal grammar, wherein the set of arbitrary formulae includes problems that are provable with at least one proof and problems that are not provable, and wherein the problem generator determines which of the problems are provable;
   a solution analyzer that uses AI to automatically analyze the logic solution submitted in response to the unique logic problem, wherein the solution analyzer references a corresponding problem specification that defines a number of functions that are utilized to check each step in the solution; and a fraud detector that analyzes the logic solution against a second logic solution to identify copying, wherein the fraud detector determines an equivalence class for both the logic solution and the second logic solution and identifies copying when both have a common equivalence class.

16. The AI logic problem platform of claim 15, wherein the solution comprises one of formal arguments, proofs, and pure logic programs.

17. The AI logic problem platform of claim 15, wherein the problem generator:
generates a set of arbitrary formulae comprised of a set of potential problems within a defined difficulty level based on inputted formal grammars and defined symbol set;
evaluates which of the potential problems have proofs; and
outputs at least one reasoning problem in a natural language.

18. The AI logic problem platform of claim 15, wherein the fraud detector analyzes subparts of the logic solution and second logic solution by substituting symbols in permutations of the logic solution and second logic solution.

19. The AI logic problem platform of claim 15, further comprising a solution recommender that recommends a set of potential next steps in response to receiving a partial solution.

20. The AI logic problem platform of claim 15, wherein the problem generator utilizes stored user profiles to personalize the unique logic problem.

* * * * *